US008958572B1

(12) United States Patent
Solbach

(10) Patent No.: US 8,958,572 B1
(45) Date of Patent: Feb. 17, 2015

(54) ADAPTIVE NOISE CANCELLATION FOR MULTI-MICROPHONE SYSTEMS

(75) Inventor: Ludger Solbach, Mountain View, CA (US)

(73) Assignee: Audience, Inc., Mountain View, CA (US)

( * ) Notice: Subject to any disclaimer, the term of this patent is extended or adjusted under 35 U.S.C. 154(b) by 790 days.

(21) Appl. No.: 12/855,600

(22) Filed: Aug. 12, 2010

Related U.S. Application Data

(60) Provisional application No. 61/325,751, filed on Apr. 19, 2010.

(51) Int. Cl.
*H04B 15/00* (2006.01)

(52) U.S. Cl.
USPC ........... 381/94.7; 381/92; 381/94.1; 381/94.2

(58) Field of Classification Search
CPC . H04R 3/005; G10L 21/0208; G10L 21/0264
USPC ................... 381/92, 94.1, 94.7; 704/226–228
See application file for complete search history.

(56) References Cited

U.S. PATENT DOCUMENTS

| | | | | |
|---|---|---|---|---|
| 6,449,586 | B1 * | 9/2002 | Hoshuyama | 702/190 |
| 6,483,923 | B1 * | 11/2002 | Marash | 381/92 |
| 6,594,367 | B1 * | 7/2003 | Marash et al. | 381/92 |
| 7,957,542 | B2 * | 6/2011 | Sarrukh et al. | 381/92 |
| 7,986,794 | B2 * | 7/2011 | Zhang | 381/92 |
| 8,005,238 | B2 * | 8/2011 | Tashev et al. | 381/94.2 |
| 8,112,272 | B2 * | 2/2012 | Nagahama et al. | 704/226 |
| 2002/0106092 | A1 * | 8/2002 | Matsuo | 381/92 |
| 2007/0088544 | A1 * | 4/2007 | Acero et al. | 704/226 |
| 2007/0253574 | A1 * | 11/2007 | Soulodre | 381/94.2 |
| 2008/0170716 | A1 * | 7/2008 | Zhang | 381/92 |
| 2008/0232607 | A1 * | 9/2008 | Tashev et al. | 381/71.11 |
| 2008/0260175 | A1 * | 10/2008 | Elko | 381/73.1 |
| 2009/0012786 | A1 * | 1/2009 | Zhang et al. | 704/233 |
| 2009/0022335 | A1 * | 1/2009 | Konchitsky et al. | 381/92 |

(Continued)

OTHER PUBLICATIONS

Hoshuyama et al. "A Robust Generalized Sidelobe Canceller with a Blocking Matrix Using Leaky Adaptive Filters" 1997.*

(Continued)

*Primary Examiner* — Shaun Roberts
(74) *Attorney, Agent, or Firm* — Carr & Ferrell LLP

(57) ABSTRACT

Null processing noise subtraction is performed per sub-band and time frame for acoustic signals received from multiple microphones. The acoustic signals may include a primary acoustic signal and one or more additional acoustic signals. A noise component signal may be determined for each additional acoustic signal in each sub-band of signals received by N microphones by subtracting a desired signal component within every other acoustic signal weighted by a complex-valued coefficient σ from the secondary acoustic signal. The noise component signals, each weighted by a corresponding complex-valued coefficient α, may then be subtracted from the primary acoustic signal resulting in an estimate of a target signal (i.e., a noise subtracted signal).

18 Claims, 8 Drawing Sheets

(56) References Cited

U.S. PATENT DOCUMENTS

| | | | | |
|---|---|---|---|---|
| 2009/0055170 | A1* | 2/2009 | Nagahama | 704/226 |
| 2009/0164212 | A1* | 6/2009 | Chan et al. | 704/226 |
| 2009/0175466 | A1* | 7/2009 | Elko et al. | 381/94.2 |
| 2009/0304203 | A1* | 12/2009 | Haykin et al. | 381/94.1 |
| 2011/0038489 | A1* | 2/2011 | Visser et al. | 381/92 |
| 2011/0099010 | A1* | 4/2011 | Zhang | 704/233 |
| 2011/0103626 | A1* | 5/2011 | Bisgaard et al. | 381/313 |
| 2011/0164761 | A1* | 7/2011 | McCowan | 381/92 |
| 2011/0274291 | A1* | 11/2011 | Tashev et al. | 381/94.1 |

OTHER PUBLICATIONS

Spriet et al. "The impact of speech detection errors on the noise reduction performance of multi-channel Wiener filtering and Generalized Sidelobe Cancellation" 2005.*

Hoshuyama et al. "A Robust Adaptive Beamformer for Microphone Arrays with a Blocking Matrix Using Constrained Adaptive Filters" 1999.*

Herbordt et al. "Frequency-Domain Integration of Acoustic Echo Cancellation and a Generalized Sidelobe Canceller with Improved Robustness" 2002.*

* cited by examiner

ADAPTIVE NOISE CANCELLATION FOR MULTI-MICROPHONE SYSTEMS

CROSS-REFERENCE TO RELATED APPLICATIONS

This application claims the benefit of U.S. Provisional Application Ser. No. 61/325,751, entitled "Adaptive Noise Cancellation for Multi-Microphone Systems," filed Apr. 19, 2010, the disclosure of which is incorporated herein by reference.

BACKGROUND OF THE INVENTION

Many methods for reducing background noise exist in an adverse audio environment. One such method is to use a stationary noise suppression system. The stationary noise suppression system will always provide an output noise that is a fixed amount lower than the input noise. Typically, the stationary noise suppression is in the range of 12-13 decibels (dB). The noise suppression is fixed to this conservative level in order to avoid producing speech distortion, which will be apparent with higher noise suppression.

To provide higher noise suppression, dynamic noise suppression systems based on signal-to-noise ratios (SNR) have been utilized. This SNR may then be used to determine a suppression value. Unfortunately, SNR, by itself, is not a very good predictor of speech distortion due to existence of different noise types in the audio environment. SNR is a ratio of how much louder speech is than noise. However, speech may be a non-stationary signal which may constantly change and contain pauses. Typically, speech energy, over a period of time, will comprise a word, a pause, a word, a pause, and so forth. Additionally, stationary and dynamic noises may be present in the audio environment. The SNR averages all of these stationary and non-stationary speech and noise. There is no consideration as to the statistics of the noise signal; only what the overall level of noise is.

In some prior art systems, an enhancement filter may be derived based on an estimate of a noise spectrum. One common enhancement filter is the Wiener filter. Disadvantageously, the enhancement filter is typically configured to minimize certain mathematical error quantities, without taking into account a user's perception. As a result, a certain amount of speech degradation is introduced as a side effect of the noise suppression. This speech degradation will become more severe as the noise level rises and more noise suppression is applied. That is, as the SNR gets lower, lower gain is applied resulting in more noise suppression. This introduces more speech loss distortion and speech degradation.

Some prior art systems invoke a generalized side-lobe canceller. The generalized side-lobe canceller is used to identify desired signals and interfering signals comprised by a received signal. The desired signals propagate from a desired location and the interfering signals propagate from other locations. The interfering signals are subtracted from the received signal with the intention of cancelling interference.

Many noise suppression processes calculate a masking gain and apply this masking gain to an input signal. Thus, if an audio signal is mostly noise, a masking gain that is a low value may be applied (i.e., multiplied to) the audio signal. Conversely, if the audio signal is mostly desired sound, such as speech, a high value gain mask may be applied to the audio signal. This process is commonly referred to as multiplicative noise suppression.

SUMMARY OF THE INVENTION

The present technology provides for null processing noise subtraction to be performed per sub-band and time frame for acoustic signals received from multiple microphones. The acoustic signals may include a primary acoustic signal and one or more additional acoustic signals. A noise component signal may be determined for each additional acoustic signal in each sub-band of signals received by N microphones by subtracting a desired signal component within every other acoustic signal weighted by a complex-valued coefficient $\sigma$ from the secondary acoustic signal. The noise component signals, each weighted by a corresponding complex-valued coefficient $\alpha$, may then be subtracted from the primary acoustic signal resulting in an estimate of a target signal (i.e., a noise subtracted signal).

In an embodiment, noise may be suppressed by receiving a primary acoustic signal, a first secondary acoustic signal and a second secondary acoustic signal. A first noise reference signal may be formed by suppressing a speech component in the first secondary acoustic signal, where the first secondary acoustic signal speech component is correlated with a speech component in the primary acoustic signal. A second noise reference signal may be formed by suppressing a speech component in the second secondary acoustic signal. The second secondary acoustic signal speech component may be correlated with the speech component in the primary acoustic signal. An energy level of a noise component in the primary acoustic signal may be reduced based on the first and the second noise reference signals.

In an embodiment, a system for suppressing noise may include a primary microphone, N secondary microphones where N is an integer greater than or equal to 2, and a noise reduction module. The primary microphone may be configured to receive a primary acoustic signal. Each of the N secondary microphones may be configured to receive a secondary acoustic signal. The noise reduction module may be executable by a processor to form a noise reference signal from each of the N secondary acoustic signals by suppressing N speech components in each secondary acoustic signal. The N suppressed speech components may include a suppressed speech component correlated with a speech component in the primary acoustic signal and N−1 suppressed speech components correlated with each of the other secondary acoustic signals. The noise reduction module may also be executed to reduce an energy level of a noise component in the primary acoustic signal based on the N noise reference signals

DETAILED DESCRIPTION OF THE INVENTION

The present technology provides for null processing noise subtraction to be performed per sub-band and time frame for acoustic signals received from multiple microphones. The acoustic signals may include a primary acoustic signal and one or more additional acoustic signals. A noise component signal may be determined for each additional acoustic signal in each sub-band of signals received by N microphones by subtracting a desired signal component within every other acoustic signal weighted by a complex-valued coefficient $\sigma$ from the secondary acoustic signal. The noise component signals, each weighted by a corresponding complex-valued coefficient $\alpha$, may then be subtracted from the primary acoustic signal resulting in an estimate of a target signal (i.e., a noise subtracted signal).

A determination may be made as to whether to adjust $\alpha$. The determination may be based on a reference energy ratio ($g_1$) and a prediction energy ratio ($g_2$), a non-acoustic sensor, and a feedback system involving the ratio of a noise cancelled signal and the energy level of any additional acoustic signal. The complex-valued coefficient $\alpha$ may be adapted when the prediction energy ratio is greater than the reference energy ratio to adjust the noise component signal. Conversely, the adaptation coefficient may be frozen when the prediction energy ratio is less than the reference energy ratio. The noise component signal may then be removed from the primary acoustic signal to generate a noise subtracted signal which may be outputted.

Figure 1A:
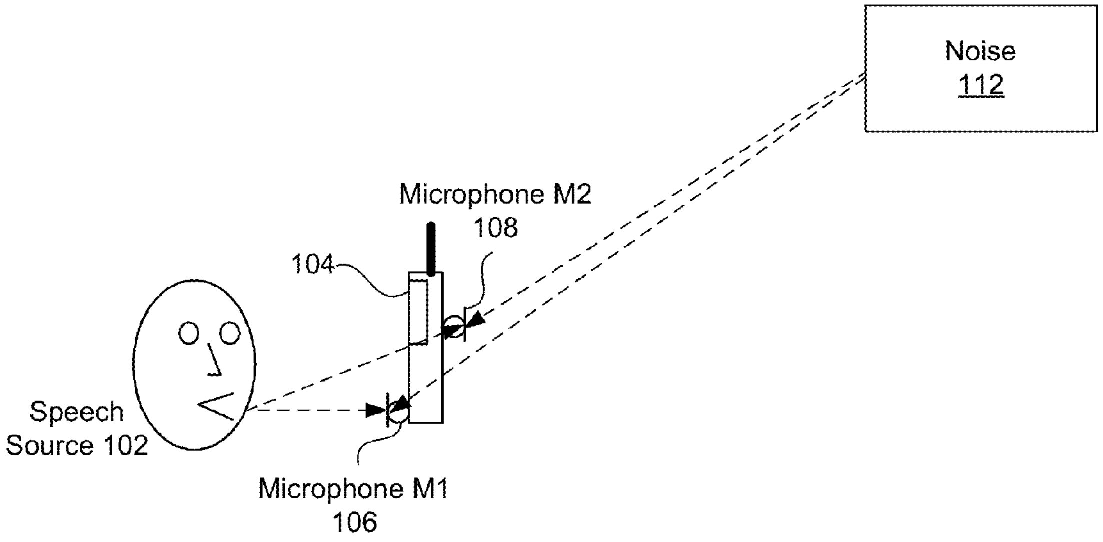
FIG. 1A is an illustration of an environment in which embodiments of the present technology may be used.

FIG. 1A is an illustration of an environment in which embodiments of the present technology may be used. A user may act as an audio (speech) source 102 to an audio device 104. The exemplary audio device 104 includes two microphones: a primary microphone 106 relative to the audio source 102 and a secondary microphone 108 located a distance away from the primary microphone 106. Alternatively, the audio device 104 may include more than two microphones, such as for example three, four, five, six, seven, eight, nine, ten or even more microphones.

The primary microphone 106 and secondary microphone 108 may be omni-directional microphones. Alternatively embodiments may utilize other forms of microphones or acoustic sensors, such as directional microphones.

While the microphones 106 and 108 receive sound (i.e. acoustic signals) from the audio source 102, the microphones 106 and 108 also pick up noise 112. Although the noise 112 is shown coming from a single location in FIG. 1A, the noise 112 may include any sounds from one or more locations that differ from the location of audio source 102, and may include reverberations and echoes. The noise 112 may be stationary, non-stationary, and/or a combination of both stationary and non-stationary noise.

Some embodiments may utilize level differences (e.g. energy differences) between the acoustic signals received by the two microphones 106 and 108. Because the primary microphone 106 is much closer to the audio source 102 than the secondary microphone 108 in a close-talk use case, the intensity level is higher for the primary microphone 106, resulting in a larger energy level received by the primary microphone 106 during a speech/voice segment, for example. On the other hand, a distant noise source will tend to have a similar energy level in primary microphone 106 and secondary microphone 108, since the distance between the microphones is far smaller than the distance between the audio device 104 and the noise source.

The level difference may then be used to discriminate speech and noise in the time-frequency domain. Further embodiments may use a combination of energy level differences and time delays to discriminate speech. Based on binaural cue encoding, speech signal extraction or speech enhancement may be performed.

Figure 1B:
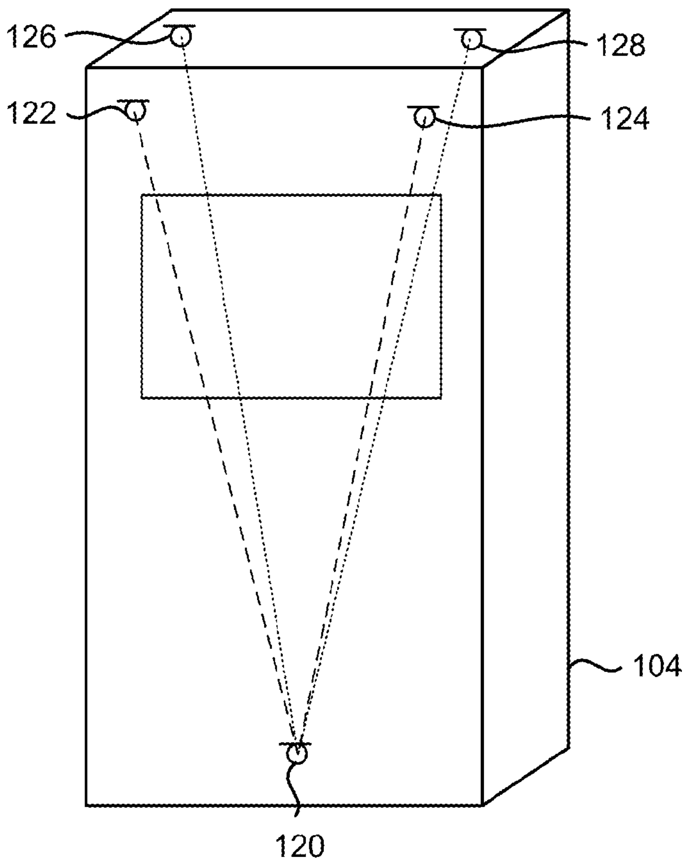
FIG. 1B is an illustration of a perspective view of a multi-microphone audio device.

FIG. 1B is an illustration of a perspective view of a multi-microphone audio device. The audio device 104 of FIG. 1B includes microphones 120, 122, 124, 126, and 128. Microphone pair 122 and 124 is positioned with respect to microphone 120 so as to form a "V" shape, such that lines from microphone 122 to microphone 120 and from microphone 124 to microphone 120 are directed towards a desired speech source (i.e., talker). Similarly, lines from microphone 126 to microphone 120 and from microphone 128 to microphone 120 are directed towards a desired speech source near the base of the phone. In some embodiments, either pair of microphones (122 and 126 or 124 and 128) may be used to point to a source.

Figure 1C:
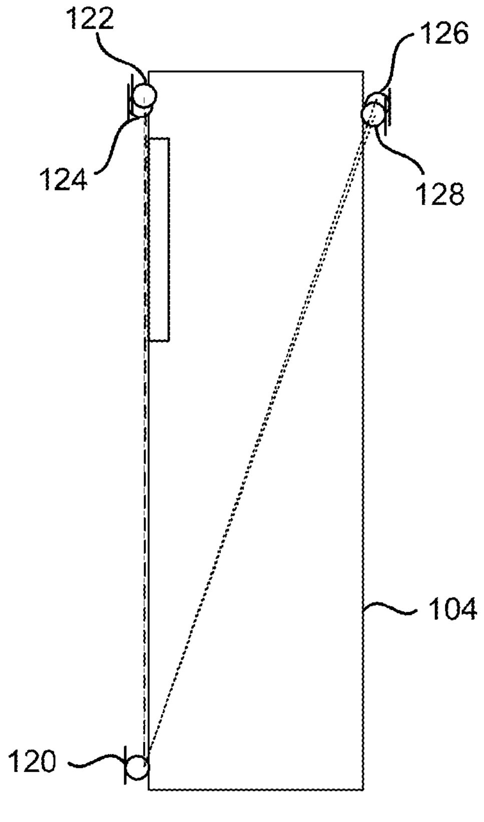
FIG. 1C is an illustration of a side view of a multi-microphone audio device.

FIG. 1C is an illustration of a side view of a multi-microphone audio device. Microphones 122, 124, 126, and 128 may be positioned with respect to microphone 120 to form a 3 dimensional cone that points to a target location (i.e., a talker using audio device 104). As such, the cone may be generally shaped from lines between microphones 122, 124, 126, and 128 to microphone 120. More or fewer than four microphones may be used to generate a three dimensional cone with respect to microphone 120, wherein the cone is directed to point at a target location.

In the embodiment illustrated in FIGS. 1B and 1C, microphone 120 is positioned more closely to the expected speech source than the other microphones 122, 124, 126, and 128. In addition, the microphones 122, 124, 126, and 128 form a 3 dimensional cone with a tip pointed at microphone 120. In some embodiments, the microphone 120 may be omitted. In such a case, the other microphones 122, 124, 126, and 128 may be arranged such that the tip of the 3 dimensional cone points to a target location such as the expected location of the audio source 102. This expected location is referred to herein as the "mouth reference point" (MRP).

Figure 2:
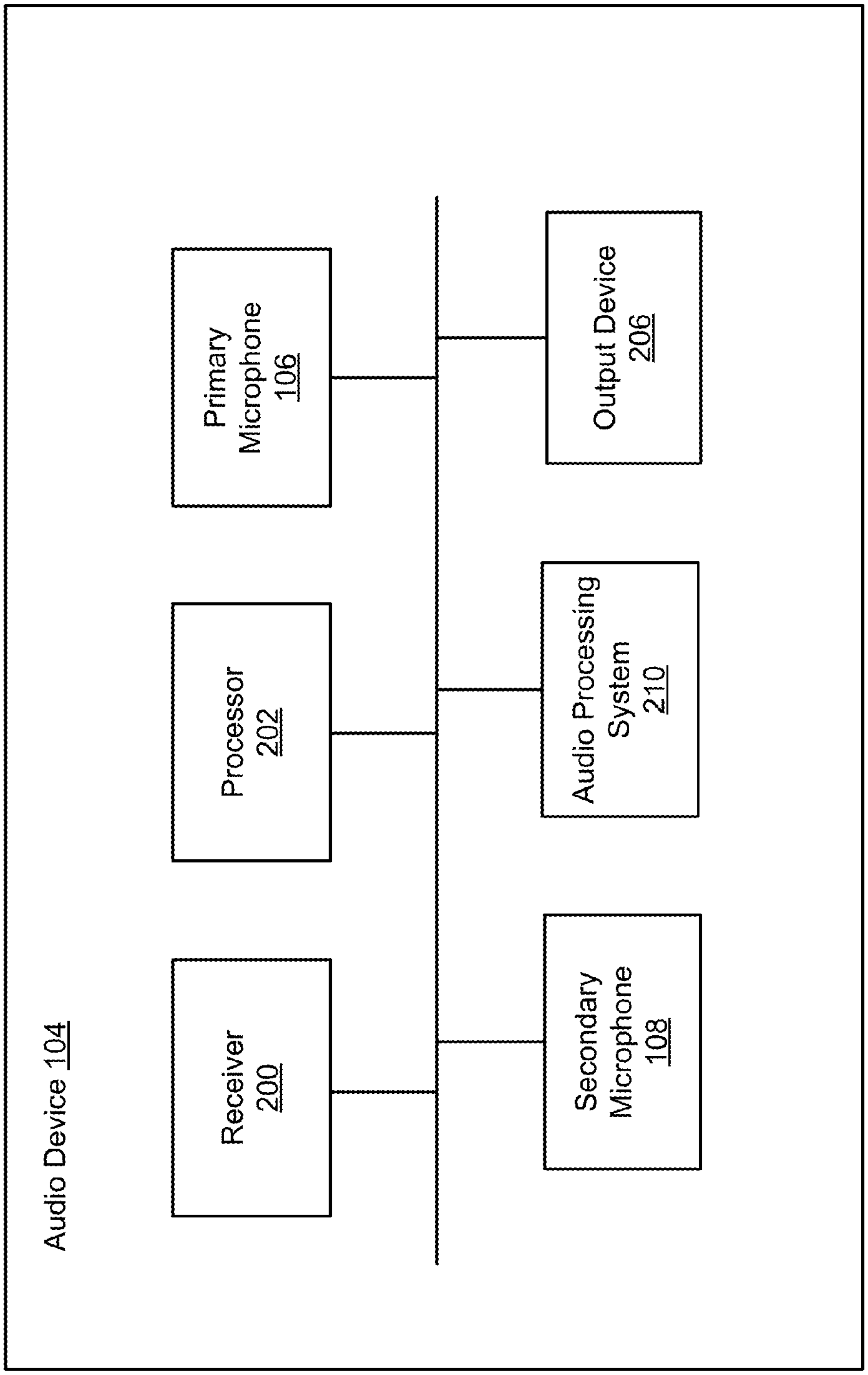
FIG. 2 is a block diagram of an exemplary audio device.

FIG. 2 is a block diagram of an exemplary audio device 104. In the illustrated embodiment, the audio device 104 includes a receiver 200, a processor 202, the primary microphone 106, an optional secondary microphone 108, an audio processing system 210, and an output device 206. The audio device 104 may include further or other components necessary for audio device 104 operations. Similarly, the audio device 104 may include fewer components that perform similar or equivalent functions to those depicted in FIG. 2.

Processor 202 may execute instructions and modules stored in a memory (not illustrated in FIG. 2) in the audio device 104 to perform functionality described herein, including noise suppression for an acoustic signal. Processor 202 may include hardware and software implemented as a processing unit, which may process floating point operations and other operations for the processor 202.

The exemplary receiver 200 is an acoustic sensor configured to receive a signal from a communications network. In some embodiments, the receiver 200 may include an antenna device. The signal may then be forwarded to the audio processing system 210 to reduce noise using the techniques described herein, and provide an audio signal to the output device 206. The present technology may be used in one or both of the transmit and receive paths of the audio device 104.

The audio processing system 210 is configured to receive the acoustic signals from an acoustic source via the primary microphone 106 and secondary microphone 108 and process the acoustic signals. Processing may include performing noise reduction within an acoustic signal. The audio processing system 210 is discussed in more detail below. The primary and secondary microphones 106, 108 may be spaced a distance apart in order to allow for detecting an energy level difference, time difference or phase difference between them.

The acoustic signals received by primary microphone 106 and secondary microphone 108 may be converted into electrical signals (i.e. a primary electrical signal and a secondary electrical signal). The electrical signals may themselves be converted by an analog-to-digital converter (not shown) into digital signals for processing in accordance with some embodiments. In order to differentiate the acoustic signals for clarity purposes, the acoustic signal received by the primary microphone 106 is herein referred to as the primary acoustic signal, while the acoustic signal received from by the secondary microphone 108 is herein referred to as the secondary acoustic signal. The primary acoustic signal and the secondary acoustic signal may be processed by the audio processing system 210 to produce a signal with an improved signal-to-noise ratio. It should be noted that embodiments of the technology described herein may be practiced utilizing only the primary microphone 106.

The output device 206 is any device which provides an audio output to the user. For example, the output device 206 may include a speaker, an earpiece of a headset or handset, or a speaker on a conference device.

In various embodiments, where the primary and secondary microphones are omni-directional microphones that are closely-spaced (e.g., 1-2 cm apart), a beamforming technique may be used to simulate forwards-facing and backwards-facing directional microphones. The level difference may be used to discriminate speech and noise in the time-frequency domain which can be used in noise reduction.

Figure 3:
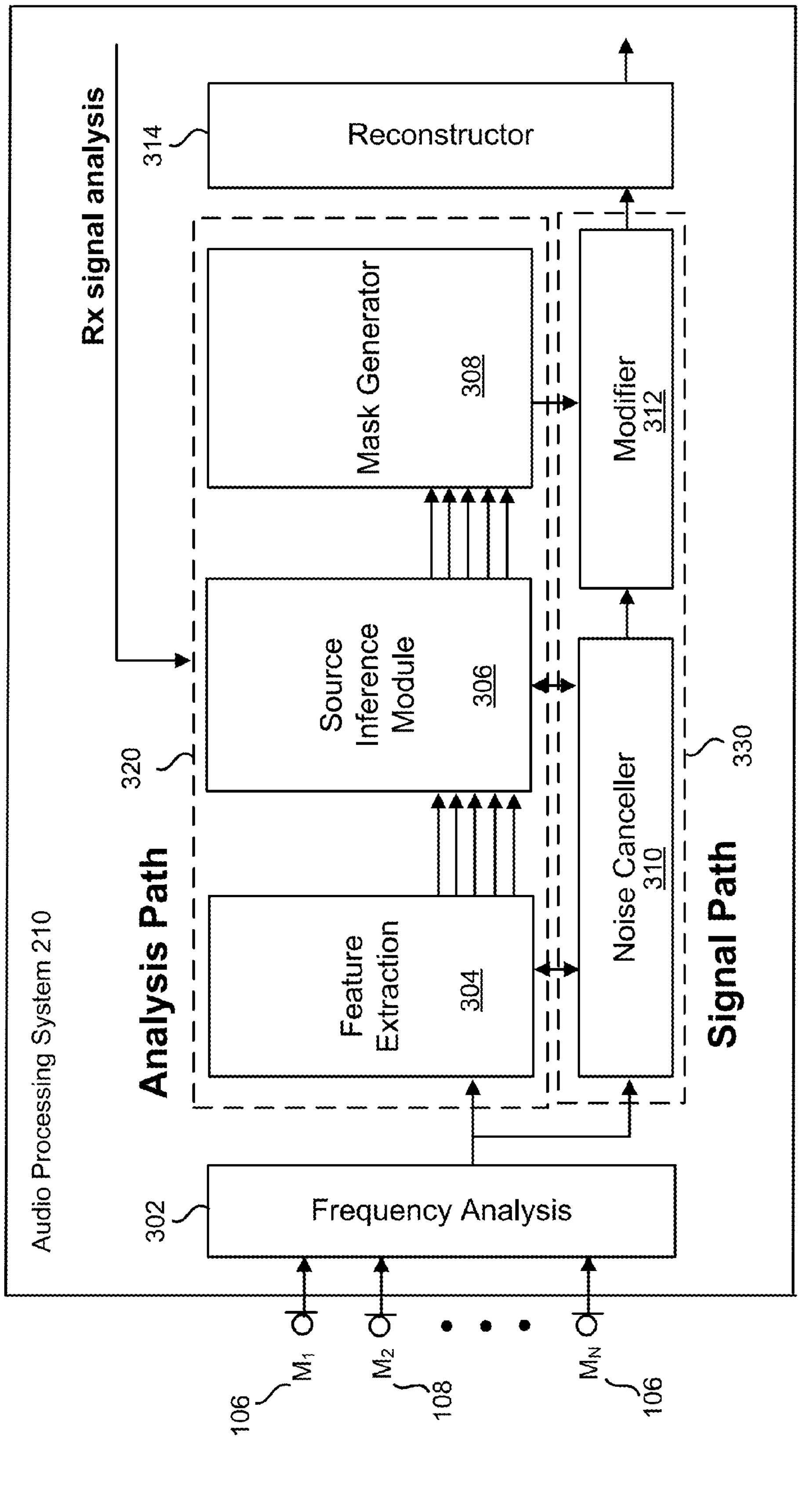
FIG. 3 is a block diagram of an exemplary audio processing system.

FIG. 3 is a block diagram of an exemplary audio processing system 210 for performing noise reduction. Audio processing system 210 may be embodied within a memory device within audio device 104. The audio processing system 210 may include a frequency analysis module 302, feature extraction module 304, source inference module 306, mask generator module 308, noise canceller module 310, modifier module 312, and reconstructor module 314. Audio processing system 210 may include more or fewer components than illustrated in FIG. 3, and the functionality of modules may be combined or expanded into fewer or additional modules. Exemplary lines of communication are illustrated between various modules of FIG. 3, and in other figures herein. The lines of communication are not intended to limit which modules are communicatively coupled with others, nor are they intended to limit the number of and type of signals communicated between modules.

In operation, acoustic signals received from the primary microphone 106 and secondary microphone 108 are converted to electrical signals which are processed through frequency analysis module 302. The acoustic signals may be pre-processed in the time domain before being processed by frequency analysis module 302. Time domain pre-processing may include applying input limiter gains, speech time stretching, and filtering using an FIR or IIR filter.

The frequency analysis module 302 receives the acoustic signals and mimics the frequency analysis of the cochlea (e.g., cochlear domain), simulated by a filter bank. The frequency analysis module 302 separates each of the primary acoustic signal and secondary acoustic signal into two or more frequency sub-band signals. The samples of the frequency sub-band signals may be grouped sequentially into time frames (e.g. over a predetermined period of time). For example, the length of a frame may be 4 ms, 8 ms, or some other length of time. In some embodiments there may be no frame at all. The results may include sub-band signals in a fast cochlea transform (FCT) domain.

The sub-band frame signals are provided by frequency analysis module 302 to an analysis path sub-system 320 and a signal path sub-system 330. The analysis path sub-system 320 may process the signal to identify signal features, classify sub-band signals as having speech components or noise components, and generate a signal modifier for noise reduction. The signal path sub-system 330 is responsible for modifying sub-band signals via noise reduction. Noise reduction may include performing subtractive noise cancellation of the primary acoustic signal and applying a modifier, such as a multiplicative gain mask generated in the analysis path sub-system 320, to the sub-band signals. The noise reduction may reduce noise and preserve the desired speech components in the sub-band signals.

Noise reduction may be performed to optimize performance of an automatic speech recognition system operating on the reconstructed signal. Hence, reconstructor 314 may output a reconstructed signal to an automated speech recognition system. Noise reduction may be performed in the form of subtractive noise reduction by noise canceller module 310 or noise suppression utilizing a multiplicative mask by modifier 312 to prepare the signal for automatic speech recognition.

Signal path sub-system 330 includes noise canceller module 310 and modifier module 312. Noise canceller module 310 receives sub-band frame signals from frequency analysis module 302. Noise canceller module 310 may subtract (e.g., cancel) a noise component from one or more sub-band signals of the primary acoustic signal. As such, noise canceller module 310 may output sub-band estimates of noise components in the primary signal and sub-band estimates of speech components in the form of noise-subtracted sub-band signals. Noise canceller module 310 may be implemented as a single subtractive block or a cascade of subtractive blocks (i.e., a cascade of subtractive blocks used for an N microphone system). Noise canceller module 310 may provide a noise cancelled signal to feature extraction module 304. The noise cancelled signal provided to feature extraction module 304 may be the output of noise canceller module 310 or an output of a cascade block within noise canceller module 310.

Noise canceller module 310 may provide noise cancellation, for example in systems with three or more microphone, based on source location by means of a subtractive algorithm. Noise canceller module 310 may also provide echo cancellation and is intrinsically robust to loudspeaker and Rx path non-linearity. By performing noise and echo cancellation (e.g., subtracting components from a primary signal sub-band) with little or no voice quality degradation, noise canceller module 310 may increase the speech-to-noise ratio (SNR) in sub-band signals received from frequency analysis module 302 and provided to modifier module 312 and post filtering modules. The amount of noise cancellation performed may depend on the diffuseness of the noise source and the distance between microphones, both of which contribute towards the coherence of the noise between the microphones, with greater coherence resulting in better cancellation. Noise canceller module 310 is discussed in more detail with respect to FIGS. 4-5.

The feature extraction module 304 of the analysis path sub-system 320 receives the sub-band frame signals provided by frequency analysis module 302 as well as an output of noise canceller module 310 (e.g., the output of the entire noise canceller module 310 or an output of a cascade block within noise canceller module 310). Feature extraction module 304 computes frame energy estimations of the sub-band signals, spatial features such as NP-ILD, ILD, ITD, and IPD between the primary acoustic signal and the secondary acoustic signal or output of noise canceller module 310, self-noise estimates for the primary and second microphones, as well as other monaural or binaural features which may be utilized by other modules, such as pitch estimates and cross-correlations between microphone signals.

A raw ILD between a primary and secondary microphone may be represented mathematically as $$ILD = \left[\left[c \cdot \log_2\left(\frac{E_1}{E_2}\right)\right]_{-1}\right]_{+1}$$

where E1 and E2 are the energy outputs of the primary and secondary microphones 106, 108, respectively, computed in each sub-band signal over non-overlapping time intervals ("frames"). This equation describes the dB ILD normalized by a factor of c and limited to the range [−1, +1]. Thus, when the audio source 102 is close to the primary microphone 106 for E1 and there is no noise, ILD=1, but as more noise is added, the ILD will be reduced.

In order to avoid limitations regarding raw ILD used to discriminate a source from a distracter, outputs of noise canceller module 310 may be used to derive an NP-ILD having a positive value for the speech signal and small or negative value for the noise components since these will be significantly attenuated at the output of the noise canceller module 310. The NP-ILD may be represented mathematically as:

$$NP - ILD = \left[\left[c \cdot \log_2\left(\frac{E_{NP}}{E_2}\right)\right]_{-1}\right]_{+1}$$

where $E_{NP}$ is the output energy of noise canceller module 310.

Source inference module 306 may process features provided by feature extraction module 304 to classify a signal as wanted (i.e., speech) or unwanted (noise or echo). The features include frame energy estimations used to compute noise estimates and derive models of the noise and speech in the sub-band signals. Source inference module 306 adaptively estimates attributes of the acoustic sources, such as their energy spectra of the output signal of the noise canceller module 310. The energy spectra attribute may be utilized to generate a multiplicative mask in mask generator module 308.

Mask generator module 308 receives models of the sub-band speech components and noise components as estimated by the source inference module 306 and generates a multiplicative mask. The multiplicative mask is applied to the estimated noise subtracted sub-band signals provided by noise canceller module 310. The modifier module 312 multiplies the gain masks to the noise-subtracted primary acoustic sub-band signals output by noise canceller module 310. Applying the mask reduces energy levels of noise components in the sub-band signals of the primary acoustic signal and results in noise reduction.

The multiplicative mask may be defined by a Wiener filter and a voice quality optimized suppression system. The Wiener filter estimate may be based on the power spectral density of noise and a power spectral density of the primary acoustic signal. The Wiener filter derives a gain based on the noise estimate. The derived gain is used to generate an estimate of the theoretical MMSE of the clean speech signal given the noisy signal. The values of the gain mask output from mask generator module 308 optimize noise reduction on a per sub-band basis per frame. The noise reduction may be subject to the constraint that the speech loss distortion complies with a tolerable threshold limit.

Modifier module 312 receives the signal path cochlear samples from noise canceller module 310 and applies a gain mask received from mask generator module 308 to the received samples. The signal path cochlear samples may include the noise subtracted sub-band signals for the primary acoustic signal. The mask provided by the Wiener filter estimation may vary quickly, such as from frame to frame, and noise and speech estimates may vary between frames. To help address the variance, the upwards and downwards temporal slew rates of the mask may be constrained to within reasonable limits by modifier 312. The mask may be interpolated from the frame rate to the sample rate using simple linear interpolation, and applied to the sub-band signals by multiplicative noise suppression. Modifier module 312 may output masked frequency sub-band signals.

Reconstructor module 314 may convert the masked frequency sub-band signals from the cochlea domain back into the time domain. The conversion may include adding the masked and phase shifted frequency sub-band signals. Alternatively, the conversion may include multiplying the masked frequency sub-band signals with an inverse frequency of the cochlea channels. Once conversion to the time domain is completed, the synthesized acoustic signal may be output to the user via output device 206 and/or provided to a codec for encoding.

An example of noise reduction system such as that disclosed in FIG. 3 is disclosed in U.S. patent application Ser. No. 12/832,920, entitled "Multi-Microphone Noise Suppression," filed Jul. 8, 2010, the disclosure of which is incorporated herein by reference. An example of a cascaded noise reduction system for multiple microphones is disclosed in U.S. patent application Ser. No. 12/693,998, entitled "Adaptive Noise Reduction Using Level Cues," filed Jan. 26, 2010, the disclosure of which is incorporated herein by reference.

The system of FIG. 3 may process several types of signals received by an audio device. The system may be applied to acoustic signals received via one or more microphones. The system may also process signals, such as a digital Rx signal, received through an antenna or other connection.

Figure 4:
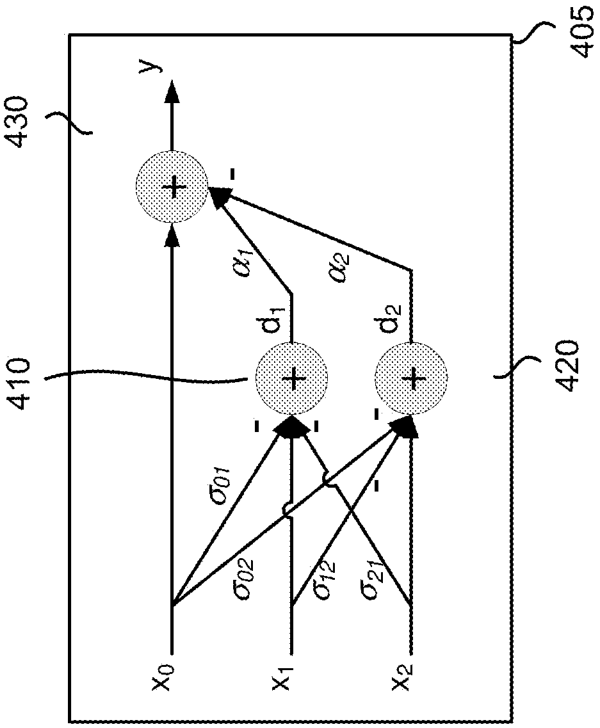
FIG. 4 is a block diagram of a schematic illustrating the operations of a noise canceller module.

FIG. 4 is a block diagram of a schematic illustrating the operation of a noise canceller module. The block diagram illustrates three acoustic sub-band signals received by a noise canceller module 405 which outputs a noise cancelled sub-band signal. The received sub-band signals include a primary sub-band signal x0 and additional (secondary) sub-band signals x1 and x2. The present technology may utilize a noise canceller module 405 per acoustic signal sub-band, and each noise canceller module 405 may process N total sub-band signals (primary acoustic sub-band signals and additional acoustic sub-band signals).

In a three microphone noise cancellation system, a noise cancellation block may receive sub-band signals of the primary microphone signal x0(*k*), a first secondary microphone signal x1(*k*), and a second secondary microphone signal x2(*k*), where k represents a discrete time or sample index. The value x0(*k*) represents a superposition of a speech signal s(k) and a noise signal n(k). The value x1(*k*) is modeled as a superposition of the speech signal s(k), scaled by a complex-valued coefficient $\sigma_{01}$ and the noise signal n(k), scaled by a complex-valued coefficient $\upsilon_{01}$. The value x2(*k*) is modeled as a superposition of the speech signal s(k), scaled by a complex-valued coefficient $\sigma_{02}$, and the noise signal n(k), scaled by a complex-valued coefficient $\upsilon_{02}$. In this case, $\upsilon$ may represent how much of the noise in the primary signal is in the secondary signals. In exemplary embodiments, $\upsilon$ is unknown since a source of the noise may be dynamic.

A fixed coefficient σ may represent a location of the speech (e.g., an audio source location) and may be determined through calibration. Tolerances may be included in the calibration by calibrating based on more than one position. For example, for a pair of close microphones, σ may be close to one. For spread microphones, the magnitude of σ may be dependent on where the audio device 102 is positioned relative to the speaker's mouth. The magnitude and phase of the σ may represent an inter-channel cross-spectrum for a speaker's mouth position at a frequency represented by the respective sub-band (e.g., Cochlea tap).

In an embodiment where there is little or no speech component in the sub-band time frame, adaptation may occur. If the speaker's mouth position is adequately represented by u, the signal at the output of a summing module may be devoid of a desired speech signal. In this case, $\sigma_{01}$ may be applied to the secondary signal x1($k$) with the result subtracted from the primary sub-band signal x0($k$). The remaining signal (referred to herein as "noise component signal") may be adaptively adjusted using a complex coefficient $\alpha_1$ and canceled from the primary sub-band signal x0 in the second branch. Similarly, $\sigma_{02}$ may be applied to the secondary signal x2($k$) with the result subtracted from the primary sub-band signal x0($k$). The remaining signal may be adaptively adjusted using a complex coefficient $\alpha_2$ and canceled from the primary sub-band signal x0 in the second branch.

An example of noise cancellation performed in some embodiments by the noise canceller module 310 is disclosed in U.S. patent application Ser. No. 12/215,980, entitled "System and Method for Providing Noise Suppression Utilizing Null Processing Noise Subtraction," filed Jun. 30, 2008, and U.S. application Ser. No. 12/422,917, entitled "Adaptive Noise Cancellation," filed Apr. 13, 2009, both of which are incorporated herein by reference.

The complex coefficients $\sigma_{ij}$ and $\alpha_i$ may be mathematically represented for two microphone, three microphone, and N microphone configurations. For $\sigma_{ij}$ and $\alpha_i$ in noise canceller blocks that process acoustic signals from two microphones, the estimate of the expected value of the cross-correlation between sub-band signals $x_n$ and $x_m$ can be defined as $\phi_{nm}=E\{x_n^* x_m\}$, where '*' denotes the complex-conjugate operator, the 0-lag least-squares error sub-band predictor $\sigma_{01}$ for the case of only the target source being active is:

The sigma coefficients can be considered as a vector of dimension 1×1, and there is 1 auto-correlation and 1 cross-correlation to perform. This configuration requires a 1×1 'matrix' to be inverted (i.e. a scalar division).

In noise canceller blocks receiving two acoustic signals, substituting $d_n$ for $x_n$ in the definition of $\phi_{nm}$ above, the 0-lag least-squares error sub-band noise predictor $\alpha_1$ for the case of the target source being inactive is $$\alpha_1=\phi_1^{-1}\cdot\phi_{10}.$$

In this case, $\alpha_i$ is a vector of dimension 1×1 and there is one 1×1 'matrix' to be inverted (a scalar division).

Returning to block 405 of FIG. 4, a weighted sub-band signal component may be determined for each received sub-band signal. The weighted sub-band signal component is determined by applying a gain coefficient of $\sigma_{ij}$ to each received sub-band signal. Each $\sigma_{ij}$ gain coefficient may be derived based on the each pair of sub-band signals. For example, $\sigma_{02}$ corresponds to sub-band signal x0 and sub-band signal x2. Each $\sigma_{ij}$ coefficient may be determined based on calibration for a fixed target position for a corresponding pair of microphones (hence, $\sigma_{12}$ may be determined based on a microphone $M_1$ and microphone $M_2$).

For each of the N−1 additional (secondary acoustic) signals (x1 and x2 in FIG. 4), the weighted component from every other signal is subtracted from that additional signal. For example, for additional signal x1, sub-band signals x0 and x2 are multiplied by $\sigma_{01}$ and $\sigma_{21}$ respectively, and the resulting weighted signals are subtracted from signal x1 at summation module 410 to form a first noise reference signal d1. Similarly, for additional signal x2, sub-band signals x0 and x1 are multiplied by $\sigma_{02}$ and $\sigma_{12}$ respectively, and the resulting weighted signals are subtracted from signal x2 at summation module 420 to form a second noise reference signal d2. Output from each summation module is a noise reference signal for the corresponding receive microphone sub-band signal.

In embodiments in which the N−1 additional signals is greater than one a noise reference signal can be formed from each of the N−1 additional signals by suppressing the speech components in each additional signal. The suppressed speech components include a suppressed speech component correlated with a speech component in the primary sub-band signal x0 and suppressed speech components correlated with each of the other additional signals. The energy level of a noise component in the primary sub-band signal x0 is then reduced based on the noise reference signals.

A determination may be made as to whether to adjust the noise reference signals output by the N−1 summation modules. Each processed noise component may optionally be adapted based on one or more constraints. The adaptation constraints may include a raw ILD, NP-ILD, or other feature derived from one or more energy levels associated with one or more sub-band signals. Adaptation of $\sigma_{ij}$ may also be performed based on the proximity of a cluster center from offline calibration measurements of valid target locations. Adaptation of $\sigma_{ij}$ may also be performed based on data provided by non-acoustic sensors, such as for example an accelerometer, GPS, motion sensor, or other non-acoustic signal sensor.

The adaptively adjusted noise reference signals are each subtracted from the primary signal x0 and output as output signal y. The sigma branches of the noise canceller block are used to cancel the target signal. The resulting noise reference signals are then used to cancel the noise signal through the alpha branches.

In noise canceller blocks that process acoustic signals from three microphones, the 0-lag least-squares error sub-band predictors $\sigma_{01}$ and $\sigma_{21}$ as well as $\sigma_{02}$ and $\sigma_{12}$ for the case of only the target source being active are:

$$\begin{pmatrix}\sigma_{01}\\ \sigma_{21}\end{pmatrix}=\begin{pmatrix}\varphi_{00} & \varphi_{02}\\ \varphi_{02}^* & \varphi_{22}\end{pmatrix}^{-1}\cdot\begin{pmatrix}\varphi_{01}\\ \varphi_{21}\end{pmatrix}$$

$$\begin{pmatrix}\sigma_{02}\\ \sigma_{12}\end{pmatrix}=\begin{pmatrix}\varphi_{00} & \varphi_{01}\\ \varphi_{01}^* & \varphi_{11}\end{pmatrix}^{-1}\cdot\begin{pmatrix}\varphi_{02}\\ \varphi_{12}\end{pmatrix}.$$

In this configuration, the sigma coefficients can be considered as a vector of dimension 4×1, and three auto-correlations and three cross-correlations may be performed. Two covariance matrices of dimension 2×2 are to be inverted.

In noise canceller blocks that process acoustic signals from three microphones, the scalar equation for $\alpha_i$ turns into a vector equation in the case of three microphones:

$$\begin{pmatrix}\alpha_1\\ \alpha_2\end{pmatrix}=\begin{pmatrix}\psi_{11} & \psi_{12}\\ \psi_{12}^* & \psi_{22}\end{pmatrix}^{-1}\cdot\begin{pmatrix}\psi_{10}\\ \psi_{12}\end{pmatrix},$$

where $\psi_{nm}=E\{d_n^* d_m\}$ and denotes the complex-conjugate operator.

Here, the $\alpha_i$ coefficients can be considered as a vector of dimension 2×1 and one 2×2 matrix is to be inverted.

Noise canceller module 405 may also process acoustic signals from N microphones. The σ coefficients can be considered as a vector of dimension ((N−1)*(N−1))×1. There are (N−1) auto-correlations and (N−1) cross-correlations to perform, and N−1 covariance matrices of dimension (N−1)×(N−1) to be inverted.

As in the two microphone scenario, each adaptation of may be constrained for tracking the target source position. One way of doing this is determining source and distractor regions in N-dimensional coefficient space from off-line calibration data. In case, either one or both of the two regions is not convex, vector quantization methods such as LBG can be used to determine discrete clusters that make up the respective region.

For N microphones where N is two or more, the σ matrices produce N−1 outputs in which the target signal is cancelled in a least-squares optimal way, if the only signal present is the target. Furthermore, the resulting signals feed back to the primary signal path weighted by N−1 $\alpha_i$ coefficients, hence cancelling a distractor signal in the primary signal path in a least-squares optimal way.

The $\alpha_i$ coefficients can be considered as a vector of dimension (N−1)×1 and one covariance matrix of dimension (N−1)×(N−1) is to be inverted.

There are several novel features about the present technology. Compared to generalized sidelobe canceller technology which targets applications having sources in the far-field, the present technology does not impose such a constraint. Rather, the present N-microphone technology fully benefits from spatial discriminability between sources by both amplitude and phase.

Additionally, compared to two microphone systems, the present N microphone technology may use an increased cancellation gain in diffuse noise. Moreover, a reduction in the directions of confusion can be achieved analogous to the principle of triangulation. With respect to the previous cascaded noise cancellation systems, the additional microphones need not be given priority over another. This is more adequate for symmetric configurations, such as the one with the primary microphone in front bottom center of the handset and two secondary microphones on the sides in the back as illustrated in FIGS. 1B-C.

Additionally, the present technology provides for easier switching of the primary microphone role to one of the secondary microphones than in the serial cascading structures, if the application would benefit from it (e.g. conference room speaker-phone), because most of the coefficients stay in place and don't need to be given time to re-converge. Also, in previous cascading structures, adaptation in the first stage triggers re-adaptations of all subsequent stages. This is not the case in the present parallel structure, which means its convergence speed is faster.

In certain applications one could decide to make the selection of the primary microphone variable. None of the additional microphones are given priority over another. As a result, microphone placement flexibility may be achieved in an audio device that utilizes the present noise reduction technology.

Figure 5:
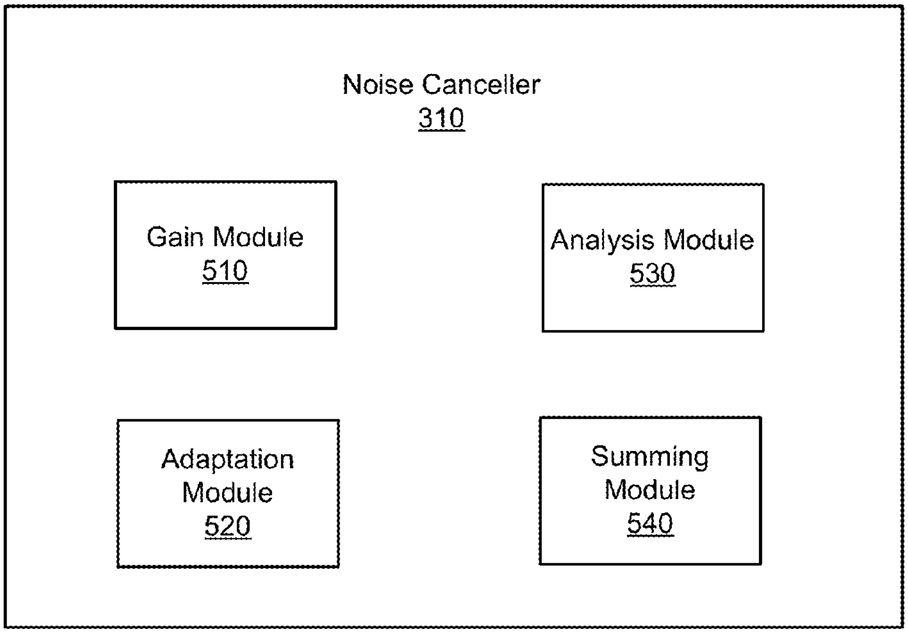
FIG. 5 is a block diagram of an exemplary noise canceller module.

FIG. 5 is a block diagram of an exemplary noise canceller module. The exemplary noise canceller 310 may suppress noise using a subtractive process. The noise canceller 310 may determine a noise subtracted signal by initially subtracting out a desired component (e.g., the desired speech component) from the primary signal in a first branch, thus resulting in a noise component. Adaptation may then be performed in a second branch to cancel out the noise component from the primary signal. In exemplary embodiments, the noise canceller 310 comprises a gain module 510, an adaptation module 520, an analysis module 530, and at least one summing module 540 configured to perform signal subtraction.

Exemplary gain module 510 is configured to determine various gains used by the noise canceller 310. For purposes of the present technology, these gains may represent energy ratios. In the first branch, a reference energy ratio ($g_1$) of how much of the desired component is removed from the primary signal may be determined. In the second branch, a prediction energy ratio ($g_2$) of how much the energy has been reduced at the output of the noise canceller 310 from the result of the first branch may be determined. Additionally, an energy ratio (i.e., NP gain) may be determined that represents the energy ratio indicating how much noise has been canceled from the primary signal by the noise canceller 310. As previously discussed, NP gain may be used in the close microphone embodiment to adjust the gain mask.

Analysis module 530 is configured to perform the analysis in the noise canceller 310, while the exemplary adaptation module 520 is configured to perform the adaptation in each branch of the noise canceller 310.

Figure 6:
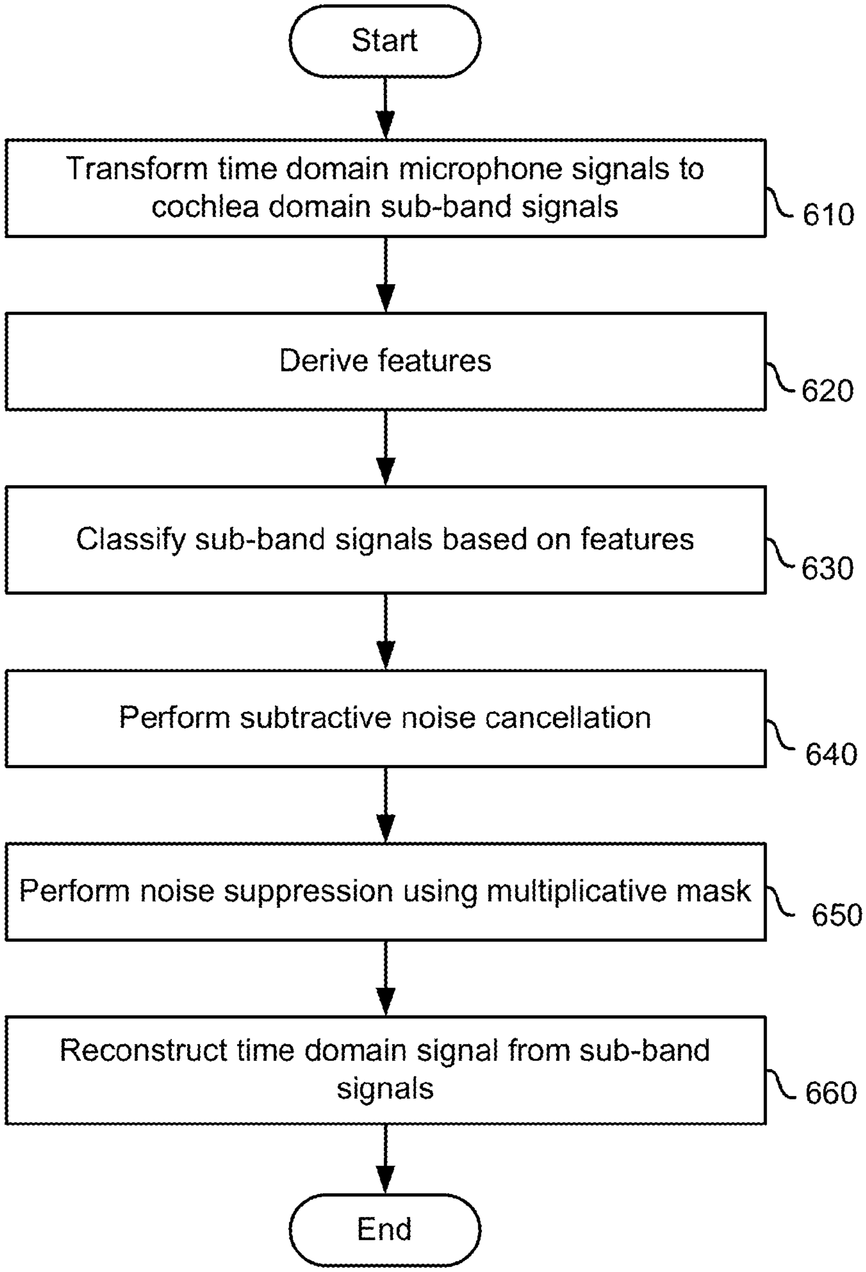
FIG. 6 is a flowchart of an exemplary method for performing noise reduction for an acoustic signal.

FIG. 6 is a flowchart of an exemplary method for performing noise reduction for an acoustic signal. Time domain microphone signals are transformed into cochlea domain sub-band signals at step 610. The transformation may be performed for signals received from primary microphone 106 and secondary microphone 108 by frequency analysis module 302.

Features may be derived at step 620. The features may be derived by feature extraction module 304 and may include both monaural and binaural features. Sub-band signals may be classified based on the derived features at step 630. Each sub-band may be classified as either speech, noise or echo for each time frame. The classification may be based upon the derived monaural and binaural features, a noise cancelled signal, and stationary noise and echo estimates.

Subtractive noise cancellation is performed at step 640. The noise cancellation may be performed by noise canceller module 310 to sub-band signals received by frequency analysis module 302. The noise cancellation may be performed using tracked spatial parameters $\sigma_{ij}$ and $\alpha_i$, provided to noise canceller module 310 by source inference module 306. Subtractive noise cancellation performed at step 640 is discussed in more detail below with respect to FIG. 7.

A multiplicative mask is applied to the noise subtracted signals output by noise canceller 310 at step 650. The multiplicative mask is generated as a result of the adaptive spatial classifier classification of each sub-band time frame cell as speech, noise or echo. The multiplicative mask may be generated by mask generator module 308 and applied to the noise subtracted sub-band signals per frame by modifier 312.

A time domain signal is reconstructed from noise reduced sub-band signals at step 660. The reconstruction is performed by reconstructor 314 and performed using complex multiplies and delays.

Figure 7:
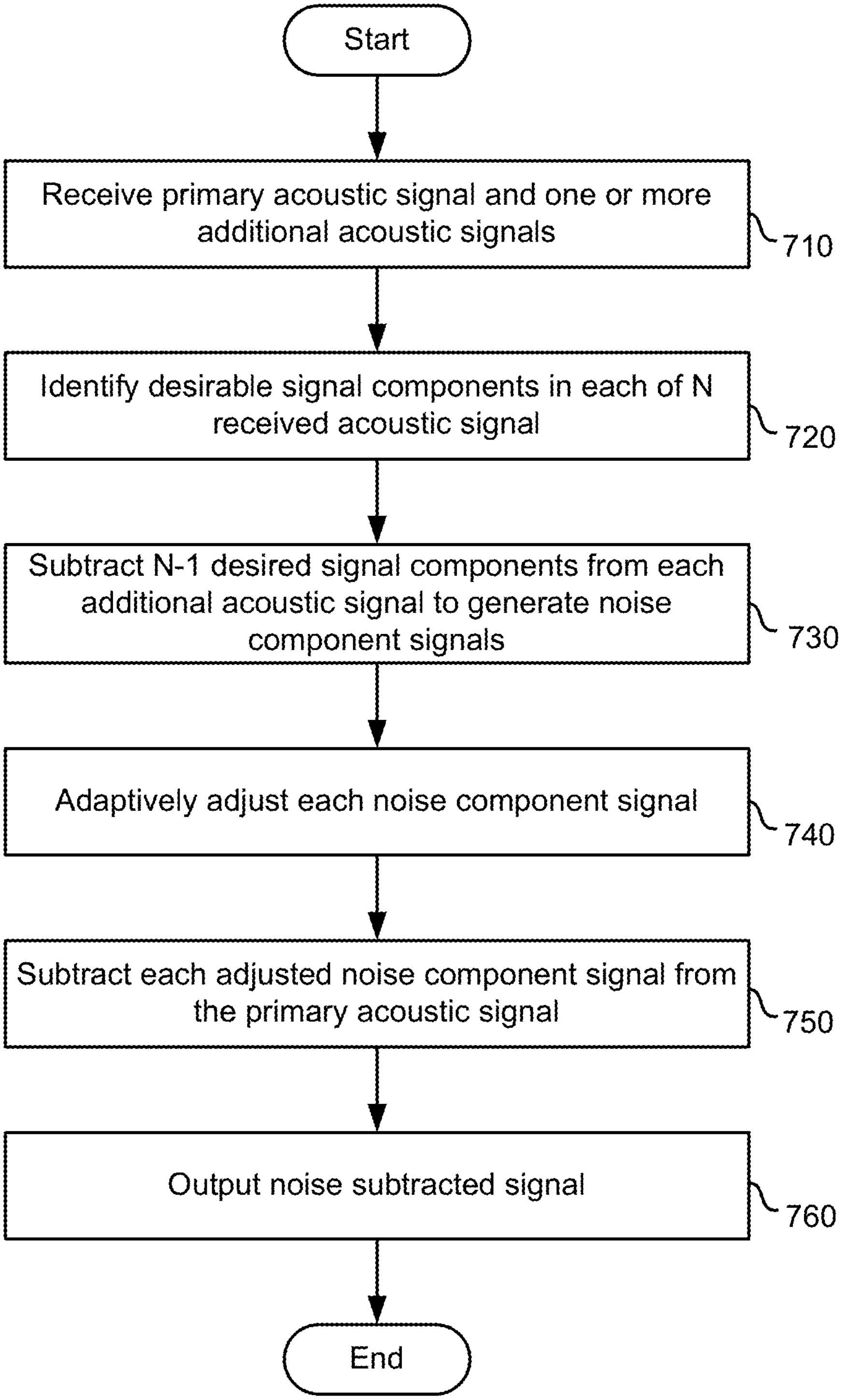
FIG. 7 is a flowchart of an exemplary method for cancelling noise using acoustic signals from multiple microphones.

FIG. 7 is a flowchart of an exemplary method for cancelling noise using acoustic signals from multiple microphones. The method of FIG. 7 provides more detail for step 640 of the method of FIG. 4.

A primary acoustic signal and one or more additional signals (or secondary signals) are received at step 710. The signals may be sub-band signals derived from up to N microphone signals.

Desirable signal components are identified in each of the N received acoustic signals at step 720. The desirable signal components may be identified by a module of noise canceller 310. Desirable signal components may then be subtracted from each additional acoustic sub-band signal to generate noise component signals at step 730. For each additional sub-band signal, the desirable component of the other additional sub-band signals is subtracted as well as the desirable component of the primary sub-band signal. The resulting signal for each subtracted additional sub-band signal is a noise component signal.

Each noise component signal is adaptively adjusted at step 740. The adjustment may be to apply a complex coefficient α to the noise component signal. The magnitude of a may be brought to zero before applying to a particular noise component signal. The adaptation may be based on an ILD, NP-ILD, non-acoustic sensor, or other factor.

Each adjusted noise component (or unadjusted noise component) may be subtracted from the primary acoustic signal at step 750. After subtracting the adjusted noise components, the noise subtracted signal is output at step 760.

The above described modules, including those discussed with respect to FIGS. 3 and 4, may include instructions stored in a storage media such as a machine readable medium (e.g., computer readable medium). These instructions may be retrieved and executed by the processor 202 to perform the functionality discussed herein. Some examples of instructions include software, program code, and firmware. Some examples of storage media include memory devices and integrated circuits.

While the present invention is disclosed by reference to the preferred embodiments and examples detailed above, it is to be understood that these examples are intended in an illustrative rather than a limiting sense. It is contemplated that modifications and combinations will readily occur to those skilled in the art, which modifications and combinations will be within the spirit of the invention and the scope of the following claims.

What is claimed is:

1. A method for suppressing noise, the method comprising:

receiving a primary acoustic signal, a first secondary acoustic signal and a second secondary acoustic signal;

forming a first noise reference signal by suppressing a first speech component sub-band in the first secondary acoustic signal correlated with a speech component sub-band in the primary acoustic signal, the forming of the first noise reference signal further including suppressing a further first speech component sub-band in the first secondary acoustic signal correlated with a second speech component sub-band in the second secondary acoustic signal;

forming a second noise reference signal by suppressing the second speech component sub-band in the second secondary acoustic signal correlated with the speech component sub-band in the primary acoustic signal, the forming of the second noise reference signal further including suppressing a further second speech component sub-band in the second secondary acoustic signal correlated with the first speech component sub-band in the first secondary acoustic signal; and reducing an energy level of a noise component sub-band in the primary acoustic signal based on the first and the second noise reference signals.

2. The method of claim 1, wherein the reducing the energy level of the noise component sub-band in the primary acoustic signal comprises suppressing the noise component sub-band in the primary acoustic signal correlated with the first and the second noise reference signals.

3. The method of claim 1, wherein the primary acoustic signal, the first secondary acoustic signal and the second secondary acoustic signal are received at respective microphones, and the primary acoustic signal is configured to be associated with any of the microphones.

4. The method of claim 1, wherein the primary acoustic signal is received from a primary microphone, the first secondary acoustic signal is received from a first secondary microphone, and the second secondary acoustic signal is received by a second secondary microphone, each of the first secondary microphone and the second secondary microphone forming a line with another microphone within a virtual cone, the virtual cone having a tip directed to a target.

5. The method of claim 4, wherein the virtual cone tip is positioned at a mouth reference point.

6. The method of claim 4, wherein the virtual cone tip is positioned at the primary microphone.

7. The method of claim 1, the method further comprising:

receiving (N−2) additional secondary acoustic signals, wherein N is greater than two, the (N−2) additional secondary acoustic signals not including the first secondary acoustic signal and the second secondary acoustic signal;

forming (N−2) additional noise reference signals from the (N−2) additional secondary acoustic signals by suppressing N speech component sub-bands in each secondary acoustic signal, the N suppressed speech component sub-bands including a suppressed speech component sub-band correlated with the speech component sub-band in the primary acoustic signal and N−1 suppressed speech component sub-bands correlated with the other secondary acoustic signals; and further reducing the energy level of the noise component sub-band in the primary acoustic signal based on the (N−2) additional noise reference signals.

8. A method for suppressing noise, the method comprising:

receiving a primary acoustic signal, a first secondary acoustic signal and a second secondary acoustic signal;

forming a first noise reference signal by suppressing a first speech component sub-band in the first secondary acoustic signal correlated with a speech component sub-band in the primary acoustic signal;

forming a second noise reference signal by suppressing a second speech component sub-band in the second secondary acoustic signal correlated with the speech component sub-band in the primary acoustic signal; and reducing an energy level of a noise component sub-band in the primary acoustic signal based on the first and the second noise reference signals;

wherein forming the first noise reference signal further includes suppressing a further first speech component sub-band in the first secondary acoustic signal correlated with the second speech component sub-band in the second secondary acoustic signal;

wherein forming the second noise reference signal further includes suppressing a further second speech component sub-band in the second secondary acoustic signal correlated with the first speech component sub-band in the first secondary acoustic signal;

wherein suppressing the first speech component sub-band in the first secondary acoustic signal correlated with the speech component sub-band in the primary acoustic signal includes applying a first coefficient to the primary acoustic signal to form a first weighted signal;

wherein suppressing the further first speech component sub-band in the first secondary acoustic signal correlated with the second speech component sub-band in the second secondary acoustic signal includes applying a second coefficient to the second secondary acoustic signal to form a second weighted signal;

wherein forming the first noise reference signal includes subtracting the first and second weighted signals from the first secondary acoustic signal;

wherein suppressing the second speech component sub-band in the second secondary acoustic signal correlated with the speech component sub-band in the primary acoustic signal includes applying a third coefficient to the primary acoustic signal to form a third weighted signal;

wherein suppressing the further second speech component sub-band in the second secondary acoustic signal correlated with the first speech component sub-band in the first secondary acoustic signal includes applying a fourth coefficient to the second secondary acoustic signal to form a fourth weighted signal; and wherein forming the second noise reference signal includes subtracting the third and fourth weighted signals from the second secondary acoustic signal.

9. The method of claim 8, further comprising:

computing the first coefficient based on the primary acoustic signal and the first secondary acoustic signal;

computing the second coefficient based on the first and the second secondary acoustic signals;

computing the third coefficient based on the primary acoustic signal and the second secondary acoustic signal; and computing the fourth coefficient based on the first and the second secondary acoustic signals.

10. A non-transitory computer readable storage medium having embodied thereon a program, the program being executable by a processor to perform a method for suppressing noise, the method comprising:

receiving a primary acoustic signal, a first secondary acoustic signal and a second secondary acoustic signal;

forming a first noise reference signal by suppressing a first speech component sub-band in the first secondary acoustic signal correlated with a speech component sub-band in the primary acoustic signal, the forming of the first noise reference signal further including suppressing a further first speech component sub-band in the first secondary acoustic signal correlated with a second speech component sub-band in the second secondary acoustic signal;

forming a second noise reference signal by suppressing the second speech component sub-band in the second secondary acoustic signal correlated with the speech component sub-band in the primary acoustic signal, the forming of the second noise reference signal further including suppressing a further second speech component sub-band in the second secondary acoustic signal correlated with the first speech component sub-band in the first secondary acoustic signal; and reducing an energy level of a noise component sub-band in the primary acoustic signal based on the first and the second noise reference signals.

11. The non-transitory computer readable storage medium of claim 10, wherein the primary acoustic signal, the first secondary acoustic signal and the second secondary acoustic signal are received at respective microphones, and the primary acoustic signal is configured to be associated with any of the microphones.

12. The non-transitory computer readable storage medium of claim 10, wherein the primary acoustic signal is received from a primary microphone, the first secondary acoustic signal is received from a first secondary microphone, and the second secondary acoustic signal is received by a second secondary microphone, each of the first secondary microphone and the second secondary microphone forming a line with another microphone within a virtual cone, the virtual cone having a tip directed to a target.

13. The non-transitory computer readable storage medium of claim 12, wherein the virtual cone tip is positioned at a mouth reference point.

14. The non-transitory computer readable storage medium of claim 12, wherein the virtual cone tip is positioned at the primary microphone.

15. The non-transitory computer readable storage medium of claim 10, the method further comprising:

receiving (N−2) additional secondary acoustic signals, wherein N is greater than two, the (N−2) additional secondary acoustic signals not including the first secondary acoustic signal and the second secondary acoustic signal;

forming (N−2) additional noise reference signals from the (N−2) additional secondary acoustic signals by suppressing N speech component sub-bands in each secondary acoustic signal, the N suppressed speech component sub-bands including a suppressed speech component sub-band correlated with the speech component sub-band in the primary acoustic signal and N−1 suppressed speech component sub-bands correlated with the other secondary acoustic signals; and further reducing the energy level of the noise component sub-band in the primary acoustic signal based on the (N−2) additional noise reference signals.

16. A non-transitory computer readable storage medium having embodied thereon a program, the program being executable by a processor to perform a method for suppressing noise, the method comprising:

forming a first noise reference signal by suppressing a first speech component sub-band in a first secondary acoustic signal correlated with a speech component sub-band in a primary acoustic signal;

forming a second noise reference signal by suppressing a second speech component sub-band in a second secondary acoustic signal correlated with the speech component sub-band in the primary acoustic signal; and reducing an energy level of a noise component sub-band in the primary acoustic signal based on the first and the second noise reference signals;

wherein forming the first noise reference signal further includes suppressing a further first speech component sub-band in the first secondary acoustic signal correlated with the second speech component sub-band in the second secondary acoustic signal;

wherein forming the second noise reference signal further includes suppressing a further second speech component sub-band in the second secondary acoustic signal correlated with the first speech component sub-band in the first secondary acoustic signal;

wherein suppressing the first speech component sub-band in the first secondary acoustic signal correlated with the speech component sub-band in the primary acoustic signal includes applying a first coefficient to the primary acoustic signal to form a first weighted signal;

wherein suppressing the further first speech component sub-band in the first secondary acoustic signal correlated with the second speech component sub-band in the second secondary acoustic signal includes applying a second coefficient to the second secondary acoustic signal to form a second weighted signal;

wherein forming the first noise reference signal includes subtracting the first and second weighted signals from the first secondary acoustic signal;

wherein suppressing the second speech component sub-band in the second secondary acoustic signal correlated with the speech component sub-band in the primary acoustic signal includes applying a third coefficient to the primary acoustic signal to form a third weighted signal;

wherein suppressing the further second speech component sub-band in the second secondary acoustic signal correlated with the first speech component sub-band in the first secondary acoustic signal includes applying a fourth coefficient to the second secondary acoustic signal to form a fourth weighted signal; and wherein forming the second noise reference signal includes subtracting the third and fourth weighted signals from the second secondary acoustic signal.

17. The non-transitory computer readable storage medium of claim 16, further comprising:

computing the first coefficient based on the primary acoustic signal and the first secondary acoustic signal;

computing the second coefficient based on the first and the second secondary acoustic signals;

computing the third coefficient based on the primary acoustic signal and the second secondary acoustic signal; and computing the fourth coefficient based on the first and the second secondary acoustic signals.

18. A system for suppressing noise, comprising:

a primary microphone configured to receive a primary acoustic signal;

N secondary microphones configured to each receive a secondary acoustic signal; and a noise reduction module executable by a processor to form a noise reference signal from each of the N secondary acoustic signals by suppressing N speech component sub-bands in each secondary acoustic signal, the N suppressed speech component sub-bands including a suppressed speech component sub-band correlated with a speech component sub-band in the primary acoustic signal and N−1 suppressed speech component sub-bands correlated with each of the other secondary acoustic signals, the noise reduction module further executable to reduce an energy level of a noise component sub-band in the primary acoustic signal based on the N noise reference signals.

* * * * *